FIG. I

DANIEL J. NEWMAN
JORGE M. MATTA
INVENTOR.

DANIEL J. NEWMAN
JORGE M. MATTA
INVENTOR.

March 10, 1970  D. J. NEWMAN ET AL  3,499,734
APPARATUS FOR NITROGEN OXIDES ABSORPTION TO PRODUCE
CONCENTRATED NITRIC ACID
Filed Jan. 5, 1967  3 Sheets-Sheet 3

DANIEL J. NEWMAN
JORGE M. MATTA
INVENTOR.

BY *J.T. Chabot*
AGENT

United States Patent Office 3,499,734
Patented Mar. 10, 1970

3,499,734
APPARATUS FOR NITROGEN OXIDES ABSORPTION TO PRODUCE CONCENTRATED NITRIC ACID
Daniel J. Newman, Jackson Heights, N.Y., and Jorge M. Matta, London, England, assignors to Chemical Construction Corporation, New York, N.Y., a corporation of Delaware
Filed Jan. 5, 1967, Ser. No. 608,949
Int. Cl. C01b 21/40; F28c 3/06
U.S. Cl. 23—283                                 14 Claims

ABSTRACT OF THE DISCLOSURE

An apparatus is provided for the absorption of nitrogen oxides from a gas stream into an aqueous absorbent solution to form nitric acid, in which re-oxidation of nitric oxide also takes place. The apparatus is provided with a lower combination heat exchanger-absorber section in which the simultaneous absorption of nitrogen dioxide, re-oxidation of nitric oxide, and cooling of the liquid phase takes place. Two or more heat exchanger sections may be provided in series. A gas-liquid contact section such as a packed section or a plurality of perforated trays is provided above the heat exchanger sections. The feed gas stream containing nitrogen oxides and excess free oxygen is passed into the apparatus below the heat exchanger sections, while the aqueous absorbent solution in admitted above the upper gas-liquid contact section.

FIELD OF THE INVENTION

Figure 1:
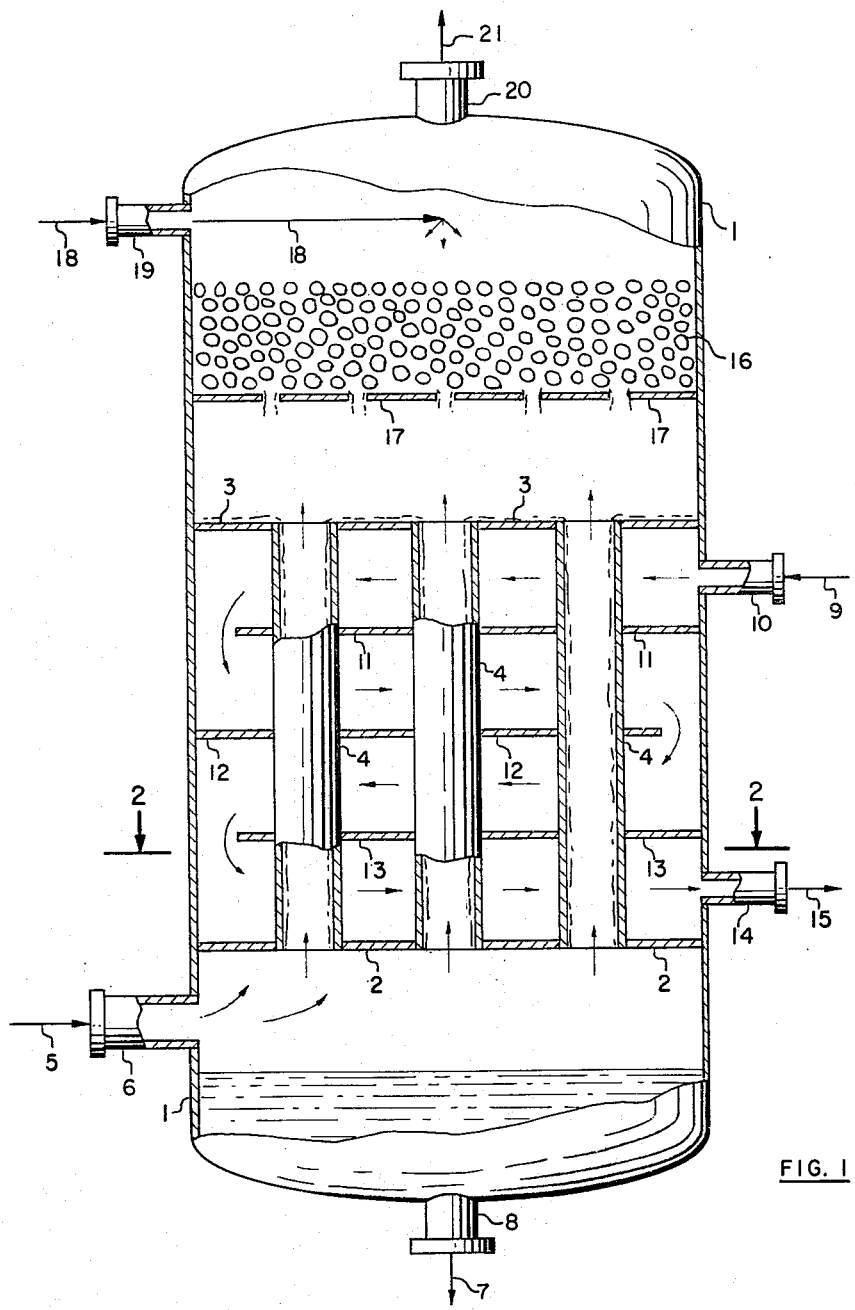

The present invention relates to the production of nitric acid, by the absorption of nitrogen oxides in an aqueous absorbent solution. An improved absorption apparatus is provided, which accomplishes the nitrogen oxides absorption in an improved and more economical manner and permits the efficient production of concentrated nitric acid.

DESCRIPTION OF THE PRIOR ART

Nitric acid is commercially produced in most instances by the catalytic oxidation of ammonia vapor with air to form a gas stream containing nitrogen oxides, such as described in U.S. Patent No. 3,102,788. The hot gas stream, containing nitrogen oxides and excess free oxygen, is cooled and then contacted with an aqueous absorbent solution in a scrubbing or absorption tower, to dissolve the nitrogen oxides and form nitric acid. In other instances, the gas stream containing nitrogen oxides is generated as a by-product of the nitration of organic compounds, or by the electric arc fixation of atmospheric nitrogen.

The mechanism of nitric acid formation is sometimes shown as the hydration of nitrogen dioxide, with the concomitant formation of nitric oxide, which is subsequently re-oxidized to nitrogen dioxide due to the presence of excess free oxygen in the gas stream. The absorption tower must therefore accommodate for two reactions, namely the absorption and hydration of nitrogen dioxide, and the oxidation of nitric oxide. The reactions are highly exothermic, and consequently the conventional absorption tower of the prior art has usually consisted of a vertically oriented tower provided with a plurality of horizontal bubble cap trays, with expensive and complex cooling coils being disposed across the upper surface of the trays. Since the process environment is highly corrosive, the absorption tower and its internals must be fabricated from expensive materials of construction such as stainless steel, which are difficult to weld, form and assemble into the complex shapes and configurations required in conventional absorption towers. Simplified packed towers or other less complex absorber arrangements have also been suggested in the prior art, such as in U.S. Patents Nos. 2,189,363; 2,169,826; 2,019,533; 2,018,249; 2,060,183 and 1,952,633, however it has generally been determined that such prior art configurations do not provide effective and complete absorption of the nitrogen oxides, usually because the re-oxidation of nitric oxide is required subsequent to nitrogen dioxide absorption and hydration.

SUMMARY OF THE INVENTION

In the present invention, an improved apparatus is provided for the effective and essentially complete absorption of nitrogen oxides from a gas stream into an aqueous absorbent solution to form nitric acid. The apparatus includes a vertically oriented container in which the absorption takes place, which is provided with a lower combination heat exchanger-absorber section in which the simultaneous absorption of nitrogen dioxide, re-oxidation of nitric oxide, and cooling of the liquid phase takes place. This section is generally defined by upper and lower horizontal partitions which are spaced apart within the container and are provided with a plurality of openings. Vertical ducts extend between the openings in the partitions. A gas-liquid contact section such as a packed section or a plurality of perforated trays is provided above the upper partition. In some instances, two or more heat exchanger sections may be provided in series with admission of dilute nitric acid between sections, when concentrated nitric acid is to be produced. The feed gas stream containing nitrogen oxides and excess free oxygen is passed into the container below the lower partition and flows upwards through the ducts, and then flows through the gas-liquid contact section. The resulting gas stream discharged from the container above the upper gas-liquid contact section is substantially free of nitrogen oxides. An aqueous absorbent solution, which generally consists of water or dilute nitric acid solution, is passed into the container above the gas-liquid contact section and flows downwards through this section and through the ducts of the heat exchanger section, preferably as a thin liquid film in extended surface contact with the rising gas stream. Absorption of nitrogen oxides into the liquid phase takes place principally within the ducts, and product nitric acid solution is removed from the container below the lower partition. A cooling fluid usually consisting of cooling water is circulated through the heat exchanger section, between the partition and external to the ducts, and serves to remove the heat of reaction generated due to the exothermic nitrogen dioxide hydration and nitric oxide oxidation reactions.

The apparatus of the present invention provides several important advantages. The apparatus is relatively simple and is readily fabricated, compared to the complex prior art assemblages such as bubble cap towers with integral cooling coils. Absorption of nitrogen oxides is rapidly and essentially completely attained in the ducts, due to countercurrent contact of the rising gas stream with the downflowing liquid absorbent solution. The apparatus accomplishes the efficient production of highly concentrated nitric acid, when two heat exchanger sections are provided in the container with injection of dilute nitric acid between sections. Finally, the apparatus readily accommodates for process surges in gas flow rate or nitrogen oxides concentration.

It is an object of the present invention to absorb nitrogen oxides from a gas stream into an aqueous absorbent solution in an improved manner.

Another object is to provide an improved apparatus for the production of nitric acid by the absorption of nitrogen oxides into an aqueous absorbent solution.

A further object is to provide an apparatus for nitric acid production which is relatively simpler than prior art assemblages and is readily fabricated.

An additional object is to provide an apparatus for nitric acid production which efficiently accomplishes the essentially complete absorption of nitrogen oxides from a gas stream into an aqueous absorbent solution.

Still another object is to attain the absorption of nitrogen oxides into an aqueous absorbent solution in an apparatus which provides a combination heat exchanger-absorber section defined by spaced apart horizontal partitions provided with opposite openings between which externally cooled vertical ducts are extended, with the absorption being attained within the ducts.

DESCRIPTION OF THE DRAWINGS AND PREFERRED EMBODIMENTS

Figure 2:
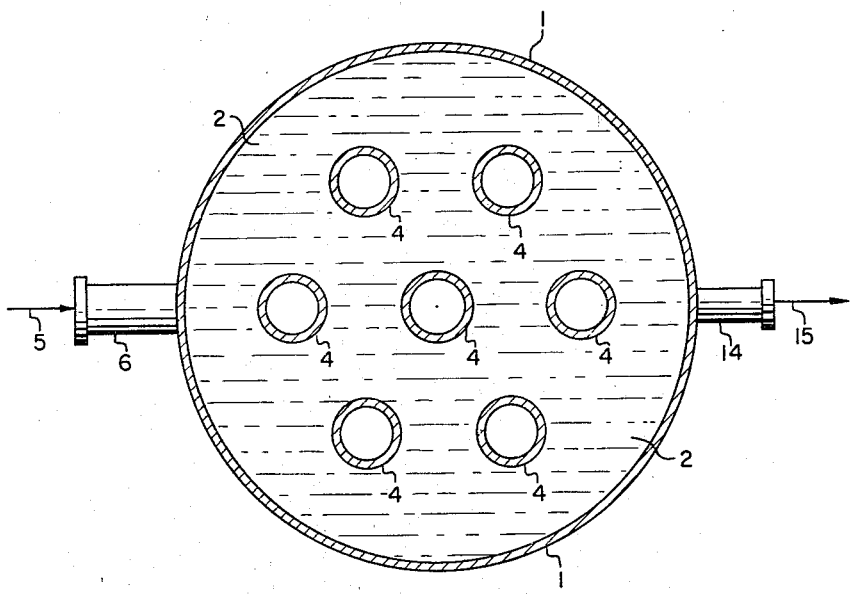
Figure 3:
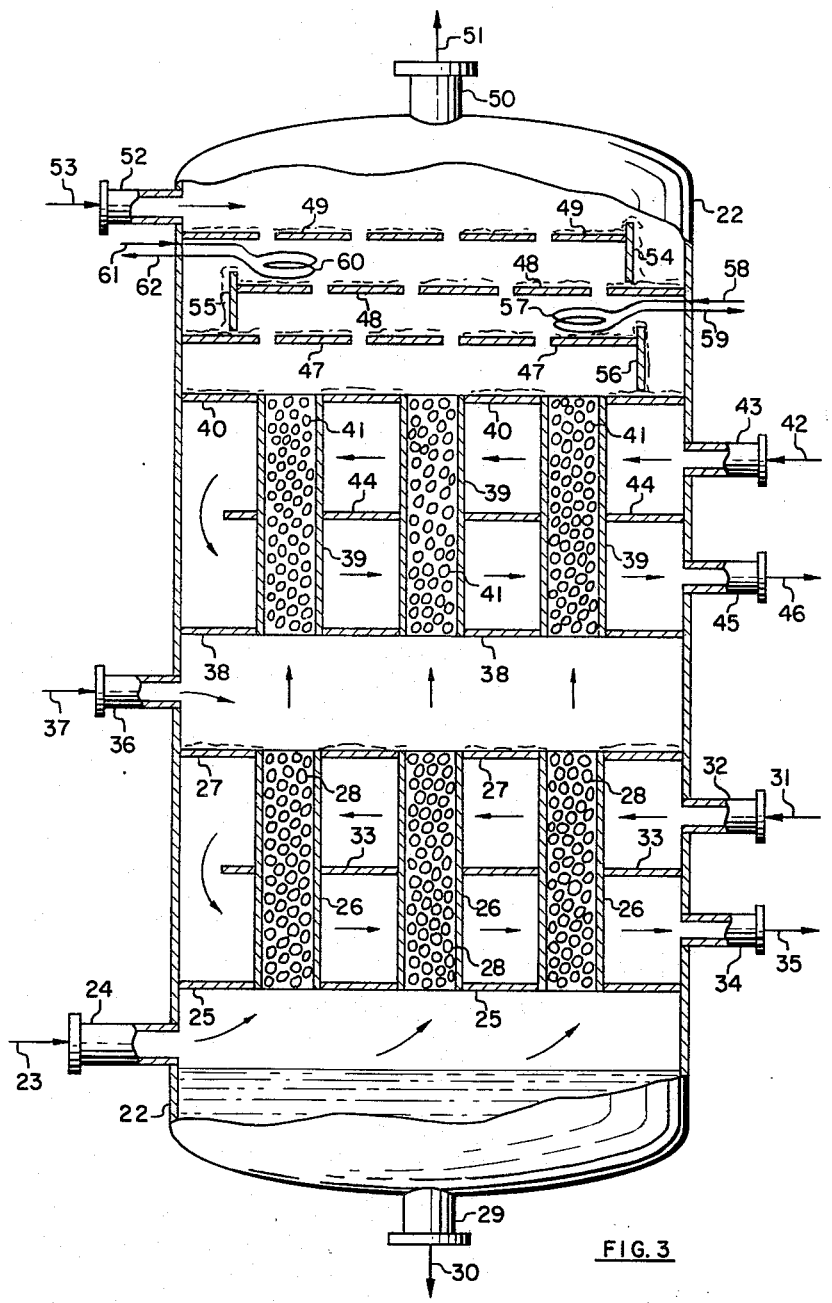

These and other objects and advantages of the present invention will become evident from the description which follows. Referring to the figures, FIGURE 1 is a sectional elevation view of one embodiment of the invention, FIGURE 2 is a sectional plan view of FIGURE 1, taken on section 2—2, and FIGURE 3 provides a sectional elevation view of another embodiment of the invention.

Referring now to FIGURE 1, the absorption of nitrogen oxides an formation of nitric acid solution is attained in the generally vertically oriented container 1, which is provided with internal horizontal partitions 2 and 3. The partitions 2 and 3 are spaced apart and are provided with a plurality of opposed openings, between which are extended the substantially vertical ducts 4. The gas stream 5 containing nitrogen oxides and excess free oxygen is admitted via nozzle 6 into container 1 below the lower partition 2, and flows upwards through ducts 4 countercurrent to downflowing films of aqueous liquid absorbent solution derived in a manner to be described infra. The downflowing liquid films, flowing on the inner surfaces of the ducts 4, absorb nitrogen dioxide from the rising gas stream with the resultant formation of nitric acid solution together with nitric oxide, which is re-oxidized due to the presence of excess free oxygen. Product nitric acid solution is discharged downwards from the ducts 4, and collects in the bottom of container 1. The product nitric acid stream 7 is removed from container 1 via nozzle 8. Stream 7 is generally subjected to a separate air stripping sequence, not shown, to remove residual nitrogen oxides not converted to nitric acid and produce a clear bleached nitric acid solution.

The reactions which take place within the ducts 4 are highly exothermic, and external cooling of the ducts 4 is provided by circulating a cooled fluid between partitions 2 and 3 and external to the ducts 4. The cooling fluid stream 9, which usually consists of cooling water, is passed via nozzle 10 into container 1 between partition 3 and baffle 11, and flows transversely external to the ducts 4 between partition 3 and baffle 11. The cooling fluid next flows transversely external to ducts 4 in an opposite direction between baffles 11 and 12, and then flows between baffles 12 and 13 external to ducts 4. The cooling fluid finally flows between baffle 13 and lower partition 2, and is discharged via nozzle 14 as warmed cooling fluid stream 15.

The rising gas phase discharged upwards from ducts 4 above partition 3 now contains only a minor residual proportion of unabsorbed nitrogen oxides. The rising gas phase is passed through suitable gas-liquid contact means disposed in the upper part of container 1. The gas-liquid contact means in the apparatus of FIGURE 1 consists of a bed 16 consisting of solid particulate packing disposed on the perforated support grid 17. The packing bed 16 may consist of any suitable type of packing, such as spheres, Raschig rings, saddles, etc. The rising gas phase discharged from ducts 4 passes upwards through the perforations in grid 17, and then is scrubbed in bed 16 with a downflowing liquid phase consisting of aqueous liquid absorbent solution stream 18, which is admitted into container 1 via nozzle 19 and suitably dispersed or sprayed into bed 16. Stream 18 consists of a suitable aqueous absorbent for nitrogen oxides, and will usually consist of water or dilute nitric acid solution. The residual nitrogen oxides are dissolved from the rising gas phase into the liquid solution in bed 16, and the residual gas phase rising from bed 16, now substantially free of nitrogen oxides, is discharged from container 1 above bed 16 via nozzle 20 as stream 21. The liquid solution flows downwards from bed 16 through the perforations in grid 17, and is then diverted by partition 3 into ducts 4 for further absorption of nitrogen oxides and formation of nitric acid as described supra.

Referring now to FIGURE 2, which is a sectional plan view of FIGURE 1 taken on section 2—2, the arrangement of the ducts 4 uniformly disposed and extending upwards from partition 2 is shown.

FIGURE 3 presents a preferred embodiment of the invention, which is particularly applicable to the production of highly concentrated nitric acid. The absorption of nitrogen oxides and formation of concentrated nitric acid is attained in the generally vertically oriented container 22, by the provision of a plurality of heat exchanger-absorber sections defined by horizontal partitions having a plurality of openings between which vertical ducts are extended. Dilute nitric acid solution is introduced into the container 22 between heat exchanger-absorber sections, and is fortified and concentrated to produce concentrated nitric acid by the provision of only partial nitrogen oxides absorption from the concentrated initial gas stream.

The feed gas stream 23 containing nitrogen oxides and excess free oxygen is passed via nozzle 24 into container 22 below horizontal partition 25. Partition 25 is provided with openings from which the substantially vertical ducts 26 extend upwards to openings in horizontal partition 27. The ducts 26 are preferably provided with suitable internal packing 28 which may consist of spheres, Raschig rings, saddles or other suitable configuration, however the packing 28 may be omitted in some instances, in which case the ducts 26 will be similar to arrangement to the ducts 4 described supra. The gas stream rises through ducts 26 and contacts a downflowing aqueous nitric acid solution, derived in a manner to be described infra, which absorbs nitrogen oxides from the gas stream to form further nitric acid in liquid solution. The downflowing solution is thereby fortified, and concentrated liquid nitric acid solution is discharged downwards from duct 26, and is collected in the bottom of container 22. Product highly concentrated nitric acid is removed from container 22 via nozzle 29 as stream 30.

The heat generated within ducts 26 due to formation of nitric acid and re-oxidation of nitric oxide is removed by external cooling of the ducts 26. A suitable cooling fluid stream 31, usually consisting of cooling water, is passed via nozzle 32 into container 22 between partition 27 and horizontal baffle 33, and flows transversely to ducts 26. Warmed cooling fluid is removed from container 22 below baffle 33 via nozzle 34 as stream 35.

Dilute aqueous nitric acid solution is passed into container 22 above partition 27 via nozzle 36 as stream 37, and is directed by partition 27 into ducts 26, flowing downwards within ducts 26 as described supra to form highly concentrated nitric acid.

The rising gas phase discharged upwards from ducts 26 now contains a substantial residual proportion of nitrogen oxides, and is directed by horizontal partition 38 into the substantially vertical ducts 39, which extend upwards from openings in partition 38 to openings in upper horizontal partition 40. The ducts 39 are preferably provided with suitable internal packing 41 which may consist of spheres, Raschig rings, saddles or other suitable packing configuration, however the packing 41 may be omitted in some instances, in which case the ducts 39 will be similar in arrangement to the ducts 4 described supra. The gas stream rises through ducts 39 and contacts a downflowing aqueous absorbent solution usually consisting of dilute liquid nitric acid, derived in a manner to be described infra, which absorbs nitrogen oxides from the gas stream to form further nitric acid in liquid solution. The downflowing liquid nitric acid solution discharged from ducts 39 passes to the upper surface of partition 27, and joins stream 37, thereafter flowing downwards through ducts 26.

The heat generated within ducts 39 due to formation of nitric acid and re-oxidation of nitric oxide is removed by external cooling of the ducts 39. Suitable cooling fluid stream 42, usually consisting of cooling water, is passed via nozzle 43 into container 22 between partition 40 and horizontal baffle 44, and flows transversely to the ducts 39. Warmed cooling fluid is removed from container 22 below baffle 44 via nozzle 45 as stream 46.

The rising gas phase discharged upwards from ducts 39 now contains a minor residual proportion of nitrogen oxides, and is contacted with an absorbent liquid usually consisting of water or dilute nitric acid in suitable gas-liquid contact means, for final removal of nitrogen oxides. In the apparatus of FIGURE 3, horizontal perforated trays 47, 48 and 49 are provided in series above partition 40, and the rising gas phase flows upwards through the perforations in trays 47, 48 and 49, thereby contacting water flowing across the upper surfaces of the trays. The residual gas phase above upper tray 40, now substantially free of nitrogen oxides, is discharged from container 22 via nozzle 50 as stream 51.

Water or other suitable aqueous solution such as dilute nitric acid is admitted into container 22 via nozzle 52 as stream 53, and flows across tray 49. In some instances, depending on relative upward gas velocity through the perforations in tray 49, a minor proportion of stream 53 will flow downwards through the perforations in tray 49. The liquid flows from tray 49 over vertical retention baffle 54, and then flows across perforated tray 48, which is similar in configuration and function to tray 49. The liquid next flows from tray 48 over vertical retention baffle 55, and is directed onto tray 47, which is similar to trays 48 and 49. The liquid finally flows across tray 47, over baffle 56, and is directed by partition 40 into ducts 39. Cooling means may be provided on the upper surfaces of the trays 47, 48 and 49 in suitable instances, such as coil 57 disposed on tray 47 which receives cooling water or other coolant via stream 58, with discharge of warmed coolant via stream 59. Coil 60 is disposed on tray 48, and receives cooling water or other coolant via stream 61, with discharge of warmed coolant via stream 62.

Numerous alternatives within the scope of the present invention, besides those mentioned supra, will occur to those skilled in the art. Referring to FIGURE 1, the ducts 4 may be provided with suitable internal packing, such as the packing mentioned supra with respect to ducts 26 and 39. The cooling fluid 9 may consist of cooling water, ambient air, a process fluid, a refrigerant or other suitable coolant. Stream 9 may be circulated within container 1 external to ducts 4 in any suitable manner, thus in one alternative the cooling fluid flow pattern may be reversed, with stream 9 flowing into container 1 via nozzle 14 and being discharged via nozzle 10. The baffles 11, 12 and 13 may be omitted in some instances, in which case stream 9 will flow parallel with ducts 4, either countercurrently or cocurrently. The packing bed 16 and support grid 17 may be replaced by other suitable gas-liquid contact means, such as the plurality of perforated trays 47, 48 and 49 discussed supra. Referring to the apparatus of FIGURE 3, the alternatives discussed supra with respect to FIGURE 1 also apply to FIGURE 3, with respect to streams 31 and 42 and their flow patterns external to ducts 26 and 39 respectively. As mentioned supra, the packing 28 and 41 may be omitted in suitable instances. In addition, the baffles 33 and 44 may be of other suitable configuration or may be omitted in some instances. Stream 37 preferably consists of dilute nitric acid, however in some cases stream 37 may consist of water or other suitable aqueous absorbent solution. The cooling coils 57 and 60 may be omitted in instances when the rising gas phase discharged upwards from ducts 39 contains a relatively low nitrogen oxides concentration. The perforated trays 47, 48 and 49 may be replaced by other suitable gas-liquid contact means, such as the packing bed 16. Finally, more than two heat exchanger-absorber sections may be provided in suitable instances, such as when the cooling fluid inlet temperature is not low enough to provide rapid heat transfer or a great amount of heat removal.

We claim:

1. An apparatus for the production of concentrated nitric acid by the absorption of nitrogen oxides from a gas stream which comprises a vertically oriented container, a first horizontal partition, said first partition being disposed within said container and being provided with a plurality of openings, a second horizontal partition, said second partition being disposed within said container and spaced above said first partition and being provided with a plurality of openings, a plurality of substantially vertical ducts, said plurality of ducts extending between the openings in said first partition and the openings in said second partition, means to circulate a cooling fluid within said container between said first partition and said second partition and external to said plurality of ducts, means for gas-liquid contact, said gas-liquid contact means being disposed within said container and spaced above said second partition, means to pass a gas stream containing nitrogen oxides and excess free oxygen into said container below said first partition, whereby said gas stream rises through said ducts and said gas-liquid contact means, means to remove unabsorbed gas substantially free of nitrogen oxides from said container above said gas-liquid contact means, means to pass an aqueous absorbent solution into said container above said gas-liquid contact means, whereby said aqueous absorbent solution flows downwards through said gas-liquid contact means and said ducts, separate tubular means to pass dilute nitric acid from a source external to said container into said container in an open space below said gas-liquid contact means and above said second partition, whereby said dilute nitric acid flows downwards in said container below said gas-liquid contact means and dilute nitric acid is uniformly distributed on said second partition and flows uniformly downwards through said ducts, and whereby said aqueous absorbent solution and said dilute nitric acid absorb nitrogen oxides to form concentrated nitric acid, and means below said first partition to remove concentrated liquid nitric acid solution from said container.

2. The apparatus of claim 1, in which said ducts are provided with internal packing consisting of a plurality of inert solid elements.

3. The apparatus of claim 1, in which said means for gas-liquid contact consists of a plurality of horizontal perforated trays.

4. The apparatus of claim 3, in which a cooling coil is provided on the upper surface of at least one of said perforated trays, together with means to pass a cooling fluid through said cooling coil.

5. The apparatus of claim 1, in which said means for gas-liquid contact consists of a packing bed containing a plurality of inert solid elements.

6. The apparatus of claim 1, in which said aqueous absorbent solution consists of water.

7. The apparatus of claim 1, in which said aqueous absorbent solution consists of dilute nitric acid solution.

8. The apparatus of claim 1, in which said means to circulate a cooling fluid within said container between said first partition and said second partition and external to said plurality of ducts comprises means to admit cooling fluid into said container adjacent to one of said partitions, means to remove cooling fluid from said container adjacent to the other of said partitions, and a plurality of staggered substantially horizontal baffles, said baffles being disposed within said container between said partitions and external to said ducts.

9. An apparatus for the production of concentrated nitric acid by the absorption of nitrogen oxides from a gas stream which comprises a vertically oriented container, a first horizontal partition, said first partition being disposed within said container and being provided with a plurality of openings, a second horizontal partition, said second partition being disposed within said container and spaced above said first partition and being provided with a plurality of openings, a first plurality of substantially vertical ducts, said first plurality of ducts extending between the openings in said first partition and the openings in said second partition, means to circulate a cooling fluid within said container between said first partition and said second partition and external to said first plurality of ducts, a third horizontal partition, said third partition being disposed within said container and spaced above said second partition and being provided with a plurality of openings, a fourth horizontal partition, said fourth partition being disposed within said container and spaced above said third partition and being provided with a plurality of openings, a second plurality of substantially vertical ducts, said second plurality of ducts extending between the openings in said third partition and the openings in said fourth partition, means to circulate a cooling fluid within said container between said third partition and said fourth partition and external to said second plurality of ducts, means for gas-liquid contact, said gas-liquid contacts means being disposed within said container above said fourth partition, means to pass a gas stream containing nitrogen oxides and excess free oxygen into said container below said first partition, whereby said gas stream rises through said first plurality of ducts, said second plurality of ducts, and said gas-liquid contact means, means to remove unabsorbed gas substantially free of nitrogen oxides from said container above said gas-liquid contact means, means to pass water into said container above said gas-liquid contact means, whereby said water flows downwards through said gas-liquid contact means, said second plurality of ducts, and said first plurality of ducts, and whereby said water absorbs nitrogen oxides to form concentrated nitric acid, means to pass dilute nitric acid into said container between said second partition and said third partition, whereby said dlute nitric acid flows downwards through first plurality of ducts and absorbs nitrogen oxides to form concentrated nitric acid, and means below said first partition to remove concentrated liquid nitric acid solution from said container.

10. The apparatus of claim 9, in which said first plurality of ducts and said second plurality of ducts are provided with internal packing consisting of a plurality of inert solid elements.

11. The apparatus of claim 9, in which said means for gas-liquid contact consists of a plurality of horizontal perforated trays.

12. The apparatus of claim 11, in which a cooling coil is provided on the upper surface of at least one of said perforated trays, together with means to pass a cooling fluid through said cooling coil.

13. The apparatus of claim 9, in which said means for gas-liquid contact consists of a packing bed containing a plurality of inert solid elements.

14. The apparatus of claim 9, in which each of said means to circulate a cooling fluid within said container between partitions and external to ducts comprises means to admit cooling fluid into said container adjacent to one of said partitions, means to remove cooling fluid from said container adjacent to the other of said partitions, and a plurality of staggered substantially horizontal baffles, said baffles being disposed within said container between partitions and external to ducts.

References Cited

UNITED STATES PATENTS

| | | | |
|---|---|---|---|
| 2,034,554 | 3/1936 | Bayer | 23—167 |
| 2,138,165 | 11/1938 | Hechenbleikner | 23—160 |
| 3,274,752 | 9/1966 | Huyghe et al. | 261—153 XR |
| 3,310,367 | 3/1967 | Mavrovic | 23—283 XR |

JAMES H. TAYMAN, JR., Primary Examiner

U.S. Cl. X.R.

23—160, 161, 252; 261—148, 149, 152, 153, 161